(12) United States Patent
Chliwnyj et al.

(10) Patent No.: US 6,426,846 B1
(45) Date of Patent: Jul. 30, 2002

(54) DECODING DIGITALLY SAMPLED SERVO TRACKS

(75) Inventors: Alex Chliwnyj; Robert Allen Hutchins, both of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/365,898

(22) Filed: Aug. 3, 1999

(51) Int. Cl.[7] ............................................... G11B 5/584
(52) U.S. Cl. .................................. 360/77.12; 360/77.01
(58) Field of Search ............................... 360/77.12, 39, 360/48, 75, 77.01, 78.02, 69

(56) References Cited

U.S. PATENT DOCUMENTS

| | | | |
|---|---|---|---|
| 3,943,565 A | 3/1976 | Frank et al. | 360/70 |
| 4,646,175 A | 2/1987 | Sokolik et al. | 360/78 |
| 4,843,495 A | 6/1989 | Georgis et al. | 560/77.15 |
| 5,418,670 A | * 5/1995 | McClure et al. | 360/131 |
| 5,432,652 A | * 7/1995 | Comeaux et al. | 360/77.12 |
| 5,448,430 A | 9/1995 | Bailey et al. | 360/77.12 |
| 5,450,253 A | 9/1995 | Seki et al. | 360/65 |
| 5,483,394 A | 1/1996 | Harman | 360/77.12 |
| 5,675,448 A | 10/1997 | Molstad et al. | 360/77.12 |
| 5,822,491 A | 10/1998 | Sasaki et al. | 386/78 |

* cited by examiner

Primary Examiner—Andrew L. Sniezek
(74) Attorney, Agent, or Firm—John H. Holcombe

(57) ABSTRACT

Servo track positioning information is asynchronously digitally sampled from adjoining servo tracks having different servo patterns, and varies between a maximum envelope and a minimum envelope of positioning information. An envelope follower receives the digital samples, detecting and providing a maximum envelope output measuring the amplitude of a burst envelope of the maximum digital samples, and detecting and providing a minimum envelope output measuring the amplitude of a burst envelope of the minimum digital samples. A "DROPOUT" threshold detector detects the received digital samples failing to meet a "DROPOUT" threshold related to the maximum burst envelope. An "ACQUIRE" detector responds to the "DROPOUT" threshold detection, detecting the minimum envelope for the envelope detector, which provides the minimum envelope output. The "DROPOUT" detection distinguishes the minimum envelope from the maximum envelope and allows measurement of the minimum envelope. A ratio of the measured maximum envelope amplitude and measured minimum envelope amplitude represents the lateral position of the servo head.

48 Claims, 9 Drawing Sheets

DECODING DIGITALLY SAMPLED SERVO TRACKS

FIELD OF THE INVENTION

This invention relates to the decoding of prerecorded servo track positioning information, and, more particularly, to the decoding of servo track positioning information from adjoining servo tracks having different servo patterns as read by a servo head to allow positioning of the servo head and of read/write elements which are at an indexed position with respect to the servo head.

BACKGROUND OF THE INVENTION

In the data storage industry, advances in technology include increases in the data storage capacity of given data storage media. One means of increasing the data storage capacity of data storage media, such as magnetic tape cartridges or magnetic tape cassettes, is to increase the track density of the data storage media, and in a corresponding manner, to decrease the width of each track.

In a typical magnetic tape, data is recorded in a plurality of parallel, longitudinal data tracks. A data head may have a plurality of data heads which have fewer numbers of read/write elements than tracks. The data tracks are divided into groups, typically interleaved, and the data head is indexed laterally with respect to the tracks to access each group of data tracks. In order to properly register the data head with the data tracks, prerecorded servo tracks are provided which are parallel to the data tracks. A servo read head located at an indexed position with respect to the read/write elements reads the servo tracks. The servo tracks provide lateral positioning information which, when read by the servo read head, can be decoded to indicate whether the servo read head is correctly positioned with respect to the servo tracks. Thus, the servo head can be moved laterally to a desired position with respect to the servo tracks so as to properly register the read/write elements with respect to a desired group of data tracks. Then, the servo head can follow the servo tracks as the media and the head are moved longitudinally with respect to each other, so that the read/write elements maintain registration with the data tracks.

As an example, the prerecorded servo track positioning information comprises adjoining servo tracks having different servo patterns, one of the servo patterns comprising a constant amplitude signal of a single first frequency, and the other servo pattern alternating between a constant amplitude burst signal of a single second frequency and a zero amplitude null signal. The resultant signal read by the servo head is a maximum signal comprising the first frequency signal combined with the second frequency burst signal and a minimum signal comprising the first frequency signal combined with the null signal. If the servo head is correctly positioned at the junction of the adjoining servo tracks, the amplitude of the combined first and second frequency signals is twice the amplitude of the combined first and null signals, and is easily decoded. Coassigned U.S. Pat. No. 5,448,430 illustrates the above discussed servo track patterns and describes a track following servo positioning system employing peak detection to determine the maximum and minimum signals.

As data capacity is increased, it is also desirable to have backward compatibility to data storage media having the prior level of data capacity, to avoid the necessity of copying all of the data recorded on the prior media onto the new media.

As the result, it is desirable to increase the track density of a data storage media, while utilizing the prior media servo tracks, so that the servo system may be operated to utilize the servo track positioning information as before for the prior media, and to utilize the same servo track positioning information in a more precise manner to access tracks at a higher track density. Thus, it becomes necessary to accurately measure the maximum and the minimum signals at servo head positions not at the center directly between the adjoining servo tracks. The problem becomes especially difficult as the servo head is positioned more directly over the first single frequency track, in that the minimum signal becomes closer to the maximum signal. It becomes difficult to differentiate between the two signals, difficult to accurately measure each of the two signals, and therefore difficult to determine the ratio between the two signals. Thus, the precise positioning of the servo head and the corresponding read/write elements also becomes difficult.

SUMMARY OF THE INVENTION

An object of the present invention is to provide decoding of servo track positioning information from adjoining servo tracks having different servo patterns to provide a broad dynamic range of positioning information.

Disclosed are a servo track decoder and method for decoding asynchronous digital samples of prerecorded servo track positioning information. The prerecorded servo track positioning information comprises adjoining servo tracks having different servo patterns, one of the servo patterns comprising a maximum a constant amplitude signal of a single first frequency, and the other servo pattern alternating between a constant amplitude burst signal of a single second frequency and a zero amplitude null signal. The resultant signal read by the servo head is a maximum signal comprising the first frequency signal combined with the second frequency burst signal and a minimum signal comprising the first frequency signal combined with the null signal. A digital servo detector asynchronously samples the signals read by the servo head.

An envelope follower receives the asynchronous digital samples, detecting and providing a maximum envelope output measuring the amplitude of a burst envelope of the maximum of the asynchronous digital samples, and detecting and providing a minimum envelope output measuring the amplitude of a burst envelope of the minimum of the asynchronous digital samples.

A "DROPOUT" threshold detector receives the asynchronous digital samples and detects the received asynchronous digital samples failing to meet a "DROPOUT" threshold related to the maximum burst envelope, providing a "DROPOUT" threshold detection signal. An "ACQUIRE" detector is coupled to the "DROPOUT" threshold detector and responds to the "DROPOUT" threshold detection to detect the minimum envelope for the envelope detector, which provides the minimum envelope output. The "DROPOUT" detection distinguishes the minimum envelope from the maximum envelope and allows measurement of the minimum envelope, whereby a ratio of the measured maximum envelope amplitude output and the measured minimum envelope amplitude output represents the lateral position of the servo head.

In further embodiments of the invention, in "TRACKING" mode, the digital samples may be qualified as exceeding the "DROPOUT" threshold to provide the maximum envelope. The "DROPOUT" threshold detector detects a predetermined programmable number related to the number of sequentially received digital samples that fail to meet the "DROPOUT" threshold.

The envelope detector may additionally employ an envelope filter for filtering, with a preceding envelope amplitude, an error amplitude between a qualified digital sample and the preceding envelope amplitude, the error amplitude multiplied by a provided programmable "TRACK ATTACK" gain value upon the error amplitude indicating an increase in the envelope amplitude, and the error amplitude multiplied by a provided programmable "TRACK DECAY" gain value upon the error amplitude indicating a decrease in the envelope amplitude. The envelope amplitude is amplified by a multiplier value, also called a multiplication "factor", in the "DROPOUT" threshold detector, by a "DROPOUT" factor to have the effect of reducing the "DROPOUT" threshold with respect to the envelope amplitude.

In a still further embodiment, upon the digital samples failing to meet the "DROPOUT" threshold, the "DROPOUT" threshold detector switches to an "ACQUIRE DECAY" mode, and an error amplitude filter filters, with the preceding envelope amplitude, an error amplitude between any digital samples, even though they are not qualified, and the preceding envelope amplitude, the error amplitude multiplied by a provided predetermined "ACQUIRE DECAY" gain. Additionally, the "ACQUIRE" detector detects a continuous sequence of qualified digital samples exceeding the amplitude threshold for a programmable predetermined number of digital samples. The "ACQUIRE" detector switches out of the "ACQUIRE" mode.

The envelope detector may continually update the respective measured envelope amplitude with the most recent filtered envelope amplitude. Additionally, the envelope detector may comprise latches which load the maximum and minimum output amplitudes, resetting the measured maximum output logic amplitude to zero, and resetting the measured minimum output logic amplitude to the greatest value.

Thus, even as the servo head is positioned more directly over the first single frequency track where the minimum signal becomes closer to the maximum signal, the present invention differentiates between the two signals, and measures the envelopes of each of the two signals, allowing determination of the ratio between the two signals. Thus, the present invention provides decoding of the servo track positioning information to provide a broad dynamic range of positioning information.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
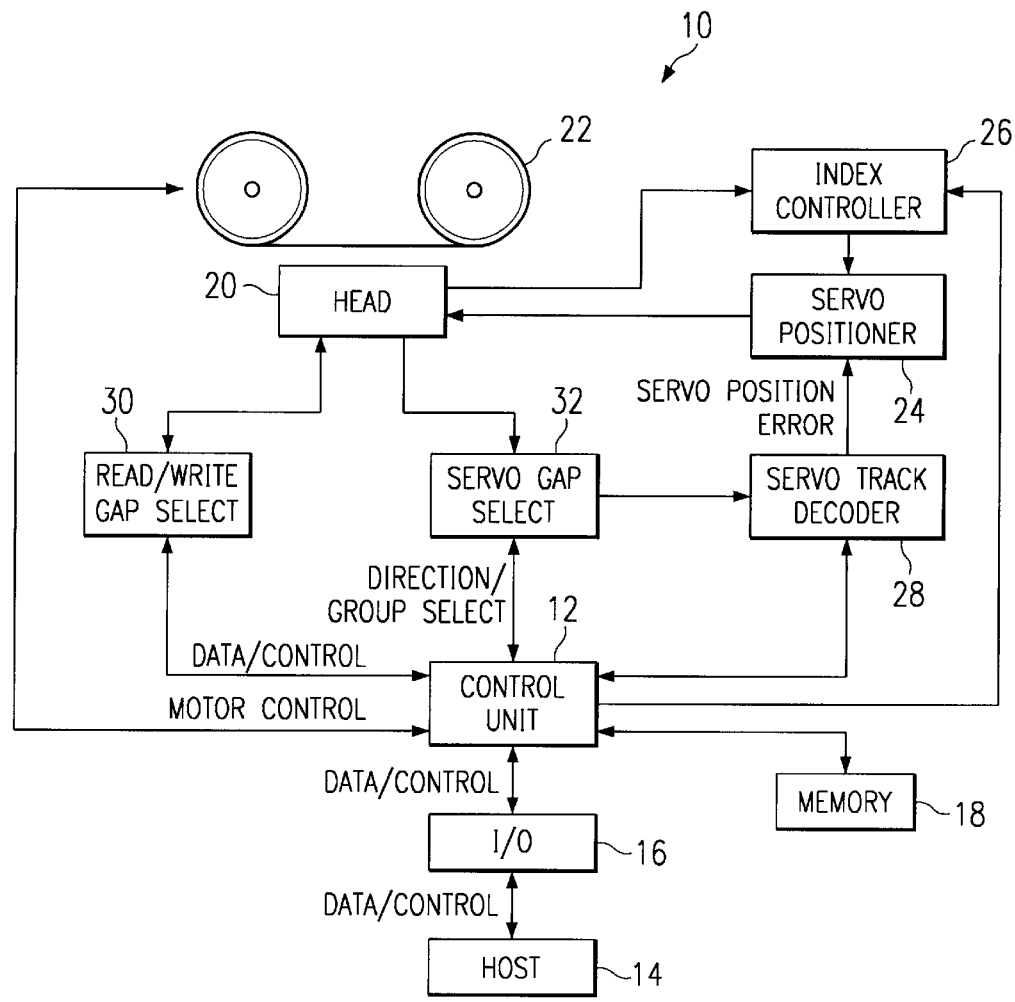
FIG. 1 is a block diagram of a magnetic tape system employing the present invention.

Referring to FIG. 1, a data storage system 10, such as a magnetic tape system, is illustrated. An example of a magnetic tape system in which the servo track positioning system of the present invention may be employed is the IBM 3590 magnetic tape subsystem. A control unit 12 is provided to and from which data and control signals are transmitted from and to a host device 14 through an interface 16. The control unit 12 is coupled to a memory device 18, such as a random access memory for storing information, such as predetermined values for changing or programming various values, as will be discussed herein. An example of a control unit 12 comprises a microprocessor, such as an Intel i960. A multi-element magnetic tape head 20, such as is well known in the art, includes a plurality of data read/write elements to record and read data onto and from a magnetic tape 22, and servo read elements to read servo signals comprising prerecorded servo track positioning information in a plurality of servo tracks on the tape 22.

A tape reel motor system (not shown) of the tape drive moves the tape 22 in the longitudinal direction, and a servo positioner 24 directs the motion of the head 20 in a lateral or transverse direction relative to the longitudinal direction of tape motion. The control unit 12 is coupled to the tape reel motors and controls the direction, velocity and acceleration of the tape 22 in the longitudinal direction.

The data tracks on the tape 22 are arranged in parallel and in parallel to the servo tracks. Thus, as a servo read element tracks a servo track, the data read/write elements track a parallel group of the data tracks. If it is desired to track another parallel group of data tracks, the head 20 is indexed laterally so that the same servo read element is aligned with another servo track, or a different servo read element is aligned with the same or a different servo track.

When the head 20 is to be moved to a selected index position, an index controller 26 is enabled by the control unit 12 and transmits an appropriate signal to the servo positioner 24 to select the appropriate servo track, while the control unit 12 transmits an appropriate signal to a servo gap selector 32 to select the appropriate servo read element. The tape system 10 may be bi-directional, in which ones of the read/write elements are selected for one direction of movement, and others of the read/write elements are selected for the opposite direction of movement. The control unit 12 additionally selects the appropriate ones of the read/write elements by transmitting a signal to a read/write gap select unit 30. In accordance with the present invention, servo track decoder 28 decodes the servo positioning information and provides the positioning information to the servo positioner 24 to align the selected servo read element to the selected servo track.

Figure 2:
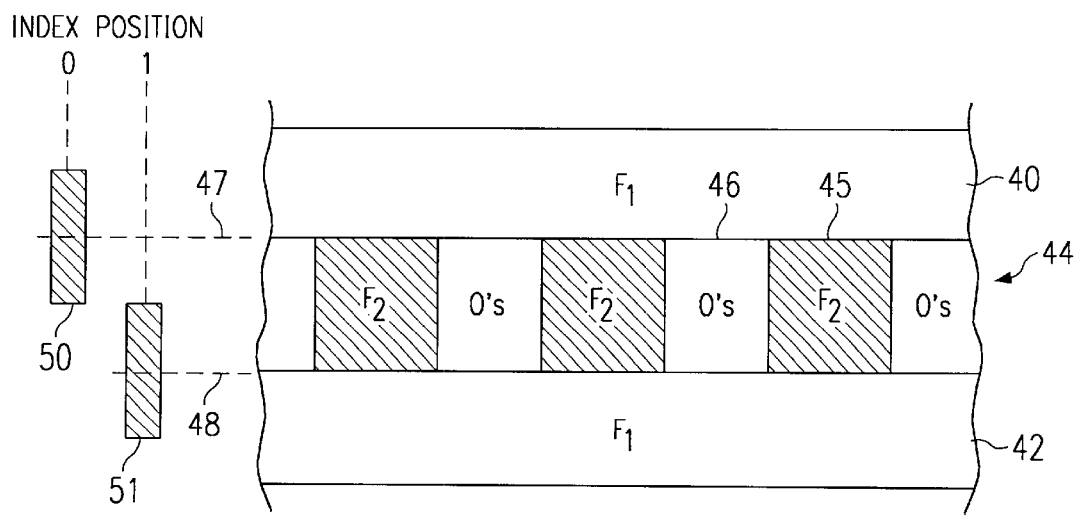
FIG. 2 is a diagrammatic illustration of a magnetic tape format of two servo index positions in a combined servo track.

FIG. 2 illustrates a magnetic tape format of two servo index positions in a combined servo track. The combined prerecorded servo track comprises two outer tracks 40 and 42, having a recorded pattern of a constant amplitude signal of a single first frequency, on either side of a middle track 44, having a recorded pattern alternating between a constant amplitude burst signal 45 of a single second frequency and a zero amplitude null signal 46.

Two servo tracks 47 and 48 are represented. When a servo read element is located at position 50, it is centered on servo track 47, and when a servo read element is located at position 51, it is centered on servo track 48. The resultant signal read by the servo element is a maximum signal comprising the first frequency signal combined with the second frequency burst signal alternating with a minimum signal comprising the first frequency signal combined with the null signal. If the servo head is correctly positioned at the junction of the adjoining servo tracks, the amplitude of the combined first and second frequency signals is twice the amplitude of the combined first and null signals. Coassigned U.S. Pat. No. 5,448,430 illustrates the above discussed servo track patterns and describes a track following servo positioning system employing peak detection to determine the maximum and minimum signals.

Figure 3:
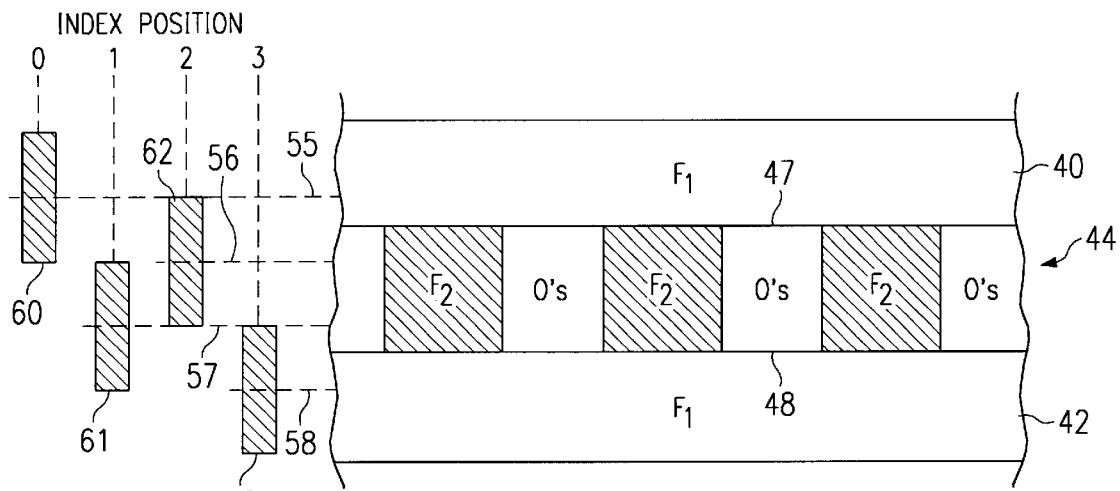
FIG. 3 is a diagrammatic illustration of a magnetic tape format employed for providing four servo index positions in the servo track of FIG. 2.

As discussed above, a more accurate dynamic range is desirable for more precise positioning of the servo head, either where the servo (and data) tracks are smaller and positioned closer together, or, as illustrated in FIG. 3, the servo tracks are unchanged, but the data tracks are positioned in a more dense arrangement.

Specifically, the combined prerecorded servo track comprises the two outer tracks 40 and 42, having a recorded pattern of a constant amplitude signal of a single first frequency, on either side of the middle track 44, which alternates between a constant amplitude burst signal and a zero amplitude null signal to provide the two servo tracks 47 and 48. Now, however, when a servo read element is centered on servo track 47 or centered on servo track 48, it is not centered with respect to any of the data tracks. Rather, the data tracks are aligned so that a servo element is located along lines 55–58 one quarter the width of the middle track 44 away from the servo track centerline in either direction. In order to center the data read/write elements in the "0" and "4" index positions, the servo read element must be located at position 60 or at position 63, and will read a minimum signal that is about 75% of the maximum signal, and to center the data read/write elements in the "1" and "3" index positions, the servo read element must be located at position 61 or at position 62, and will read a minimum signal that is about 25% of the maximum signal. It is apparent that any significant noise will result in exaggeration of the minimum signal in position 61 or in position 62, and any noise will result in difficulty in distinguishing the maximum from the minimum signal in position 60 or in position 63.

Figure 4:
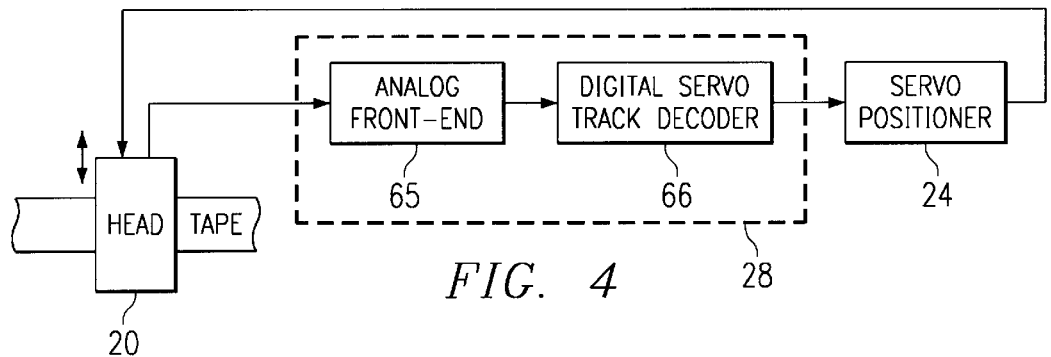
FIG. 4 is a block diagram illustrating a servo track positioning system for decoding asynchronous digital samples of prerecorded servo track positioning information from a tape of FIG. 1 and for positioning of read/write elements in accordance with the present invention.

FIG. 4 illustrates a servo track positioning system in accordance with the present invention for reading the analog servo signals at the servo element of head 20, having a servo track decoder 28 for converting the analog servo signals to asynchronous digital samples of the signal in analog front end 65 and a digital servo track decoder 66 to decode the digital samples and determine the amplitudes of the envelopes of the minimum and the maximum signals represented by the digital samples. The servo positioner 24 then positions the servo element of head 20 and thereby positions the read/write elements in accordance with the decoded positioning information. Thus, the servo track decoder 28 decodes the servo positioning information and provides the positioning information to the servo positioner 24 to align the selected servo read element to the selected servo track, or at an intermediate position so as to properly align the read/write elements at the desired data tracks.

Figure 5:
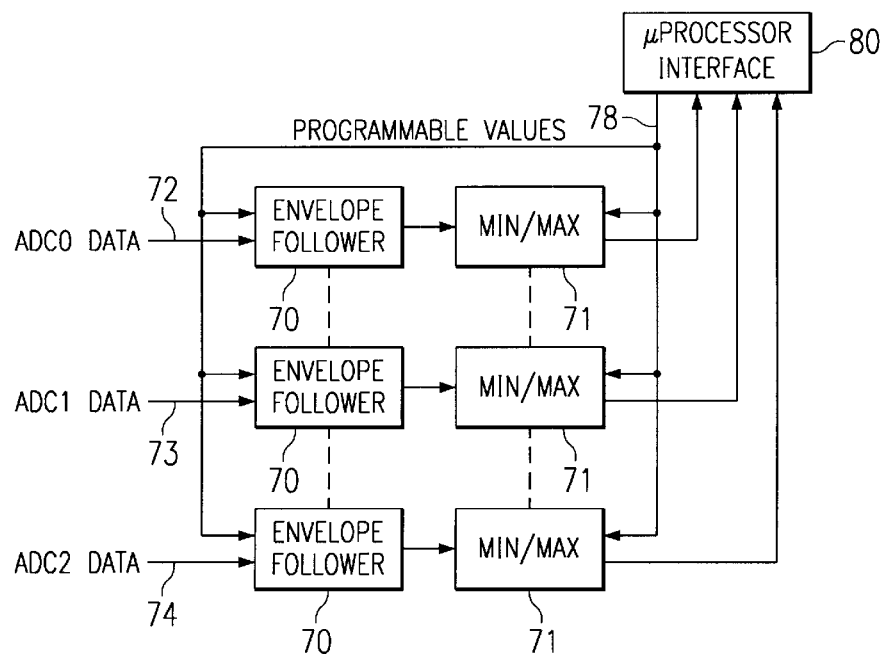
FIG. 5 is a block diagram of a plurality of the servo track decoders of FIG. 4 and an interface for supplying programmable values for the servo track decoders.

FIG. 5 illustrates a plurality of the digital servo track decoders of FIG. 4, each comprising an envelope follower 70 and a minimum/maximum detector 71. Each of the envelope followers 70 receives the asynchronous digital samples of a different servo element from an associated analog front end on a respective line 72–74.

In accordance with the present invention, various media, such as magnetic tape having different magnetic characteristics (perhaps due to differences in materials), or having different servo or data track densities (as discussed above), may be utilized by providing different programmable values on lines 78 for the servo track decoders, either by the control unit of FIG. 1, or by a separate microprocessor, at microprocessor interface 80. The output is provided to the microprocessor at interface 80 for operating the servo positioner.

Figure 6A:
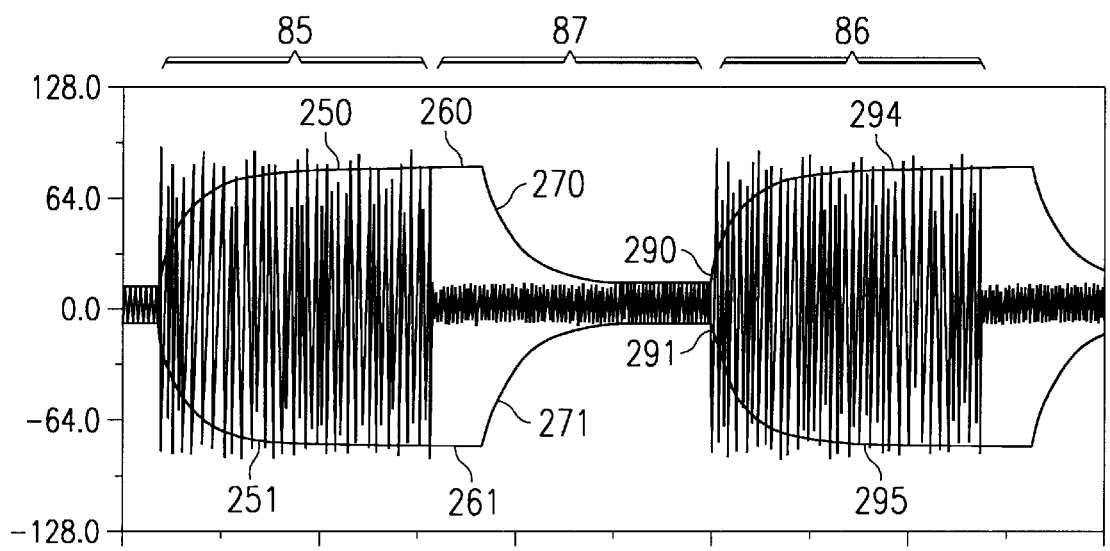
FIGS. 6A and 6B are illustrations of exemplary analog servo signals for different positions of a servo read head and examples of digital envelopes of the respective analog servo signals generated by a servo track decoder of FIGS. 4 and 5.
Figure 6B:
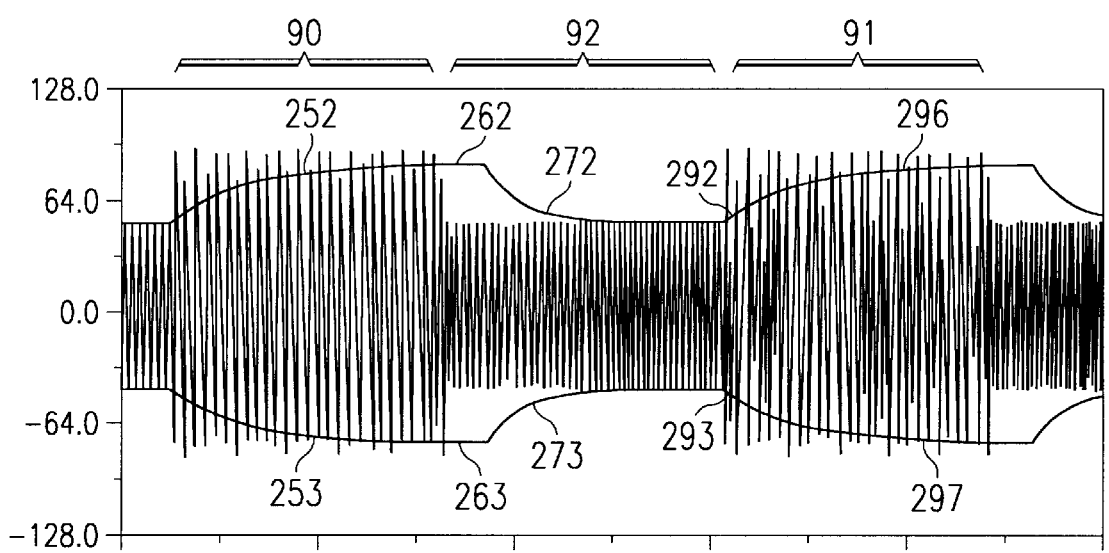

FIGS. 6A and 6B illustrate wave forms of the analog signal from the servo transducer at, respectively, positions 61 and 63 of FIG. 3. Thus, in FIG. 6A, the bursts 85 and 86 formed while the servo transducer is at position 61 from the combination of the first frequency and the second frequency burst is at a high amplitude, but the burst 87 formed from the combination of the first frequency and the null signal is at a very low amplitude because only a small portion of the servo transducer is positioned over the first frequency. Although it is easy to distinguish the bursts, it is difficult to measure the precise ratio of the bursts in the presence of noise, and therefore difficult to detect the precise position of the servo transducer.

In FIG. 6B, the bursts 90 and 91 formed while the servo transducer is at position 63 from the combination of the first frequency and the second frequency burst is at a high amplitude, as is the burst 92 formed from the combination of the first frequency and the null signal, because the servo transducer is positioned primarily over the first frequency. Thus, it is difficult to distinguish the bursts in the presence of noise, and therefore difficult to detect the precise position of the servo transducer.

Briefly, additionally referring to FIGS. 4 and 5, the present invention digitally distinguishes the bursts and then provides the amplitudes of the envelopes of the respective bursts so that the ratio may be determined. The digital servo detector in the analog front end 65 asynchronously samples the signals read by the servo head. An envelope follower 70 receives the asynchronous digital samples, detecting and providing a maximum envelope output measuring the amplitude of a burst envelope of the maximum of the asynchronous digital samples, and detecting and providing a minimum envelope output measuring the amplitude of a burst envelope of the minimum of the asynchronous digital samples.

A "DROPOUT" threshold detector receives the asynchronous digital samples and detects the received asynchronous digital samples failing to meet a "DROPOUT" threshold related to the maximum burst envelope, providing a "DROPOUT" threshold detection signal. An "ACQUIRE" detector responds to the "DROPOUT" threshold detection to detect the minimum envelope for the envelope detector, which provides the minimum envelope output. The "DROPOUT" detection distinguishes the minimum envelope from the maximum envelope and allows measurement of the minimum envelope in minimum/maximum logic 71. Thus, a ratio of the measured maximum envelope amplitude output and the measured minimum envelope amplitude output represents the lateral position of the servo head.

FIGS. 7–12 illustrate a specific embodiment of a servo track decoder in accordance with the present invention, and FIGS. 13–18 are flow charts depicting an embodiment of a method in accordance with the present invention.

Figure 7:
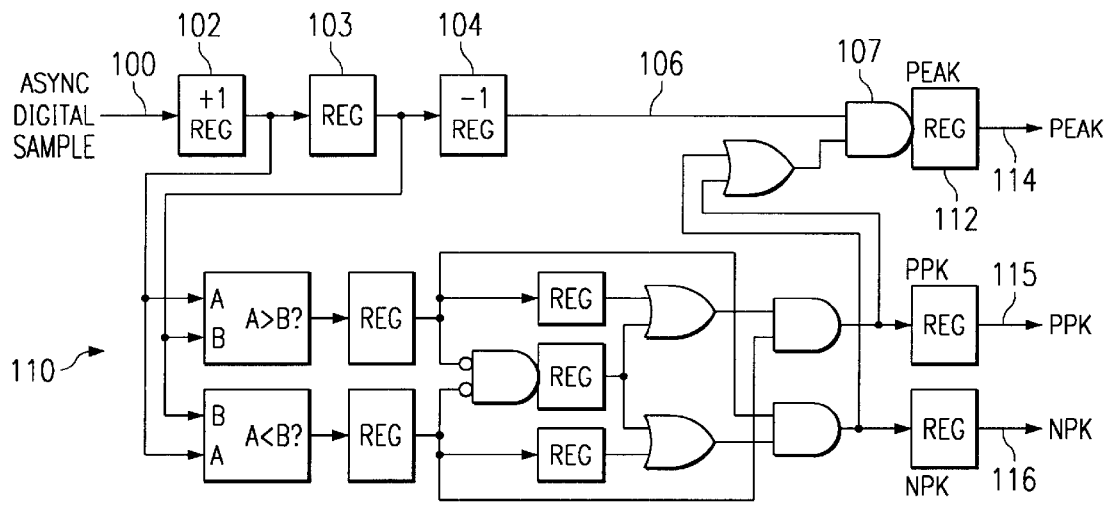
FIG. 7 is a block diagram of an embodiment of a peak identifier of the servo track decoder of FIGS. 4 and 5.

FIG. 7 is a block diagram of an embodiment of a peak identifier of the servo track decoder. The peak identifier is not a peak detector, and does not operate in synchronism with the analog signal read by the servo read element. Rather, the peak identifier is provided with the asynchronous digital samples of the analog signal provided by the analog front end 65 of FIG. 4. Thus, the asynchronous digital samples may represent any point on the combined wave form as read by the servo read element. The peak identifier determines whether any sample is greater than the preceding and succeeding samples (a positive peak), or is less than the preceding and succeeding samples (a negative peak). The sign of the digital samples indicates whether the sample is from the positive side of the wave form or from the negative side.

The asynchronous digital samples are provided at input 100 to registers 102–104. The registers are arranged in sequence and operate in sequence at each clock time. Thus, a digital sample is first held at register 102, is held at register 103 at the next clock time, and at register 104 at the following clock time. As the result, a current sample is at register 103, while the preceding sample is at register 104 and the succeeding sample is at register 102. The sample is passed to input 106 of gate 107, and logic 110 operates gate 107 to gate each positive or negative peak to register 112 and provide the digital sample at output 114. If there is no positive and no negative peak, register 112 is set to "0". Outputs 115 and 116 are flags indicating, respectively, that the peak at output 114 is a positive or a negative peak.

Figure 8:
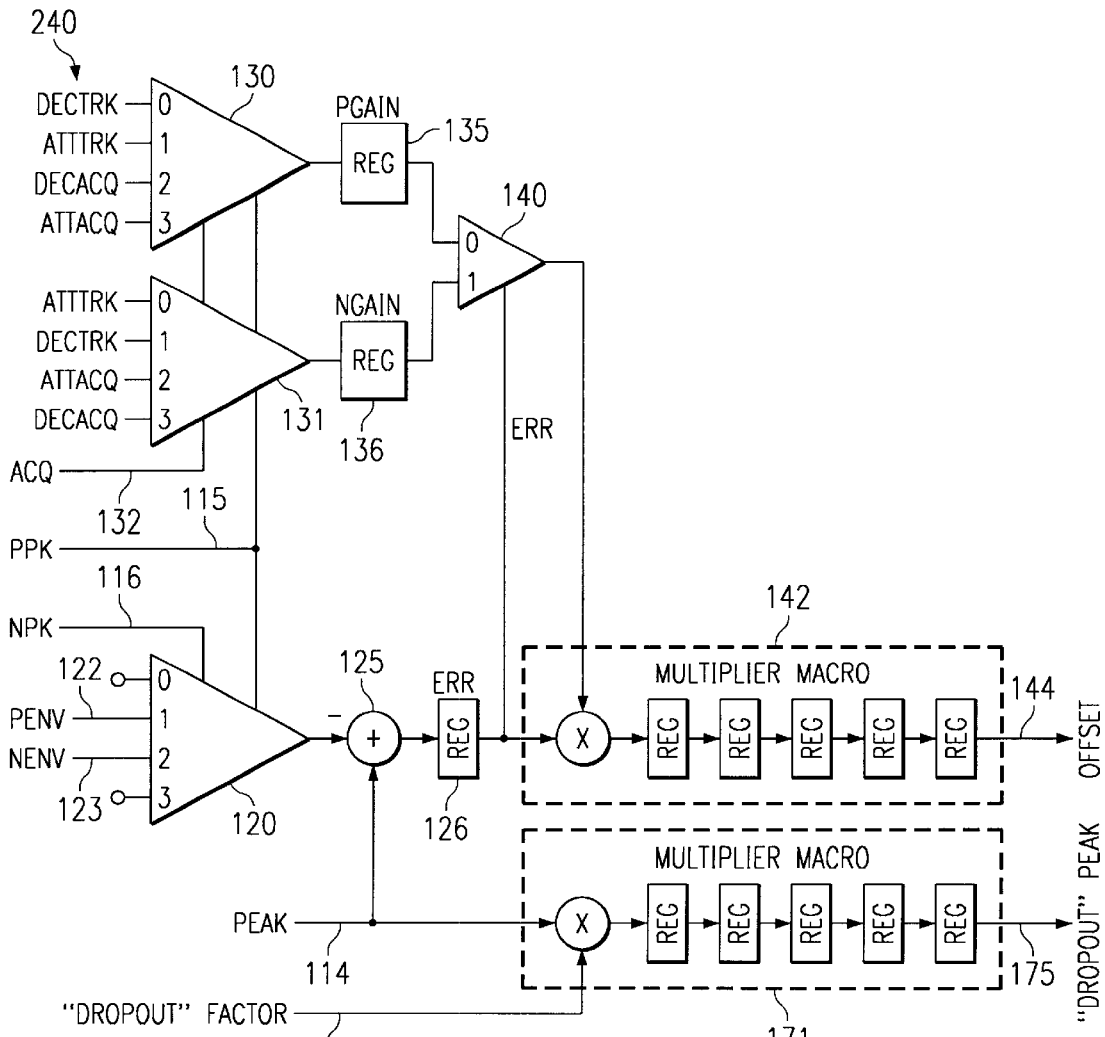
FIGS. 8 and 9 are block diagrams of an embodiment of an error amplitude filter of the servo track decoder of FIGS. 4 and 5.
Figure 9:
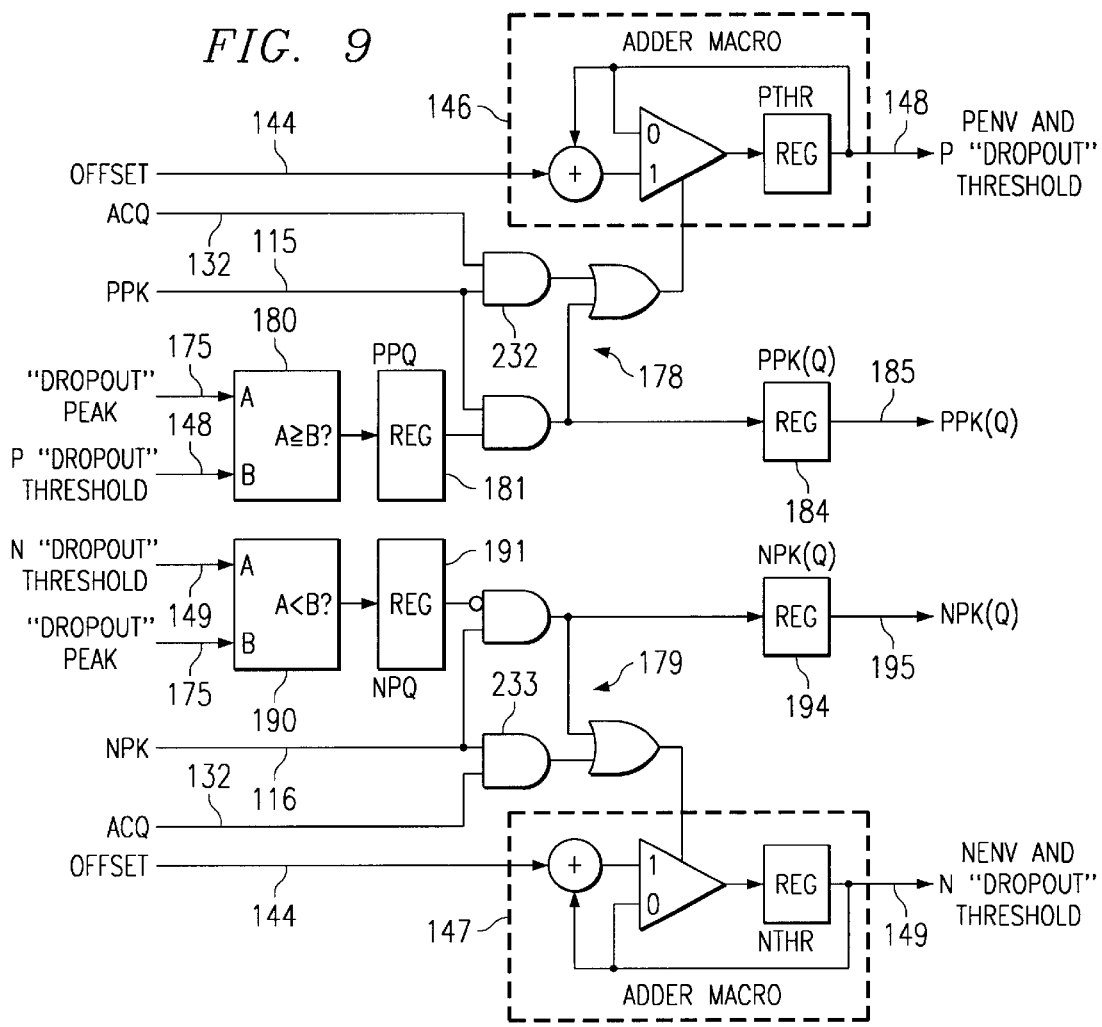

FIGS. 8 and 9 illustrate an embodiment of the envelope follower, including an error amplitude filter, of the servo track decoder. In FIG. 8, the positive peak flag 115 or the negative peak flag 116 operate a multiplexor 120 to provide either the present positive envelope value from input 122 or the present negative envelope value from input 123, as will be described. If there is no peak flag, there is no output from the multiplexor 120.

The present envelope value is subtracted from the peak by logic 125 to provide an error value at register 126. The error value represents the difference between the present envelope and the detected "peak" asynchronous digital sample.

In accordance with one aspect of the present invention, the envelope detector may continually update the respective envelope amplitude with a most recent filtered envelope amplitude. When in a "TRACKING" mode, only "qualified" peaks update the envelope amplitudes, as will be explained. The filtration is initiated with multiplexors 130 and 131. A positive gain 135 and a negative gain 136 are selected by an "ACQUIRE" mode input 132, in which a "0" indicates that the servo track decoder is operating in "TRACKING" mode, and a "1" indicates that the servo track decoder is operating in "ACQUIRE" mode, as will be described, and the presence or absence of a positive peak indication on line 115. The sign of the error operates multiplexor 140 to select the appropriate gain and supply it to multiplier 142 which calculates the value of the offset to apply to the positive or negative part of the envelope, and supplies the offset at output 144. The gain is set so that the offset value represents a small change to be made to the envelope value, such as one sixteenth of the error. In FIG. 9, the offset is applied to the previous positive or negative envelope value to filter, or adjust, the envelope value by the offset, updating the envelope value. The offset value is applied at inputs 144 to adders 146 and 147, which update, respectively, the positive and negative envelope values at outputs 148 and 149. Thus, the outputs 148 and 149 follow the respective positive and negative halves of the envelope.

Figure 10:
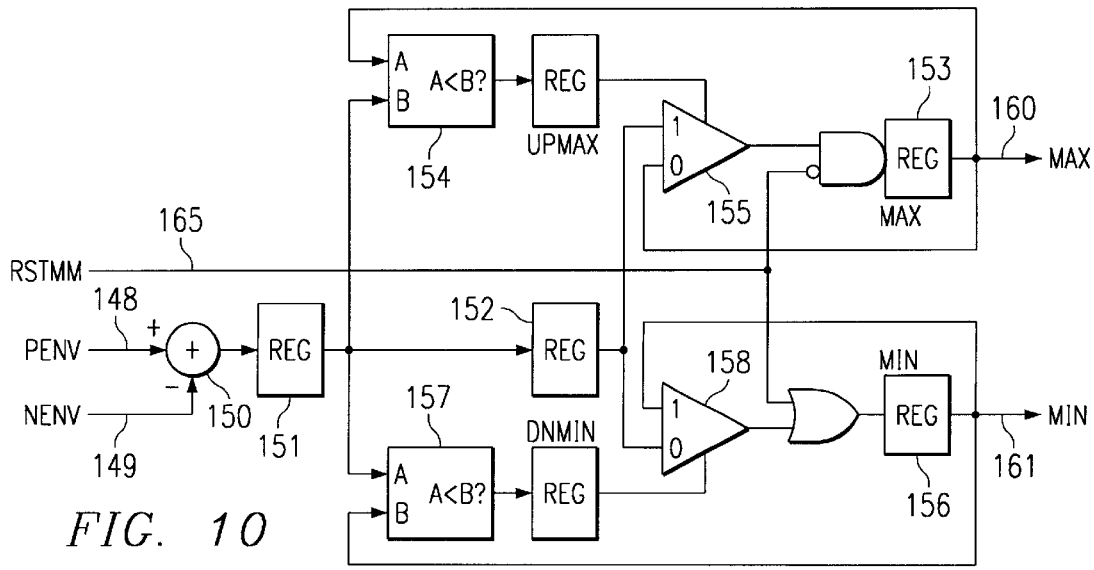
FIG. 10 is a block diagram of an embodiment of an envelope follower of the servo track decoder of FIGS. 4 and 5.

An embodiment of the maximum/minimum logic 71 of FIG. 5 is illustrated in detail in FIG. 10. The positive and negative envelope signals from the envelope follower of FIGS. 8 and 9 are provided at inputs 148 and 149. Logic 150 sums the amplitudes of the positive and negative envelope signals to provide the total width of the envelope, which is stored for one clock cycle in register 151, and for the next clock cycle in register 152. The previous maximum value for an envelope is stored in register 153 and is fed back to a comparator 154 and a multiplexor 155. The previous minimum value for an envelope is stored in register 156 and fed back to a comparator 157 and a multiplexor 158. Thus, the detected envelope value of register 151 is continually compared to the previous maximum envelope value at comparator 154 and to the previous minimum envelope value at comparator 157.

So long as the previous maximum envelope value from register 153 is greater than the detected envelope value of register 151, the comparator 154 remains at "0" and the previous maximum envelope value is transmitted by the multiplexor 155 to the register 153 for another clock cycle. If, however, the detected envelope value is greater, comparator 154 operates multiplexor 155 to gate the detected envelope value from register 152 (a clock matching register) to register 153, establishing a new maximum envelope. The new maximum envelope value is provided on line 160.

So long as the previous minimum envelope value from register 156 is less than the detected envelope value of register 151, the comparator 157 remains at "1" and the previous minimum envelope value is transmitted by the multiplexor 158 from register 152 to the register 156 for another clock cycle. If, however, the detected envelope value is less, comparator 157 operates multiplexor 158 to gate the detected envelope value to register 156, establishing a new minimum envelope. The new minimum envelope value is provided on line 161.

Thus, the minimum/maximum logic is continually reviewing each detected envelope to define a decreased minimum envelope or an increased maximum envelope. At selected times, the microprocessor 80 of FIG. 5 will read the most recent minimum and maximum envelope values into latches, and provides a reset signal on line 165, which resets the maximum envelope register 153 to all "0" and resets the minimum envelope register 156 to the maximum value of all "1". Thus, the next detected envelope at register 151 will be both smaller than the previous (reset) minimum and larger than the previous (reset) maximum, and both register 153 and register 156 will be set into the respective registers. As additional envelopes are detected, the maximum envelope will increase and the minimum envelope will decrease, providing the highest degree of differentiation between the envelopes.

In typical operation, while following the minimum and then the maximum envelopes, the servo track decoder is operating in "TRACKING" mode, employing only "qualified" peaks which exceed a "DROPOUT" threshold. Thus, the envelope measurement will tend to grow to the maximum value of the actual envelope of the received digital samples, rather than representing an average of all the samples, which may occur at any point of the wave form. In so doing, the need for a true peak detector is avoided.

In accordance with the present invention, the minimum envelope is distinguished from the maximum envelope. This is accomplished in accordance with the present invention by a "DROPOUT" threshold detector, an embodiment of which is illustrated in FIGS. 8–9 and 11–12, which also comprises the peak qualification in which to provide the "qualified" peaks, discussed above. In FIG. 8, a "DROPOUT" threshold is established at a level less than the present positive or negative envelope. The detected digital sample is then compared to the "DROPOUT" threshold to determine whether the mode of the logic should be changed, as will be explained. The "DROPOUT" threshold may be directly calculated as a percentage of the envelope amplitude. In the embodiment of FIGS. 8 and 9, the "DROPOUT" threshold is calculated indirectly, by providing the positive and negative envelope values from outputs 148 and 149 without reduction, but by multiplying the detected digital sample at input 114 by a "DROPOUT" amplifier factor at input 170 in multiplier 171, and provides the resultant peak value at output 175. The "DROPOUT" threshold may be programmed (or a value set) by programming a value on input 170.

As defined herein, "program", "programming" and "programmed" refer to the ability to set, either automatically or manually, desired values of predetermined inputs. The values may be established for particular types of media, or for different tracks of the same media. In the illustrated embodiment, the programmed values are provided by microprocessor 80 of FIG. 5 on inputs 78, which are individually defined either hereinafter, or as input 170 of FIG. 8.

The "DROPOUT" threshold amplitude detection of the detector is illustrated in FIG. 9. A positive threshold comparator 180 receives the amplified "DROPOUT" asynchronous digital peak sample at input 175 and compares the "DROPOUT" peak to the previous envelope value, also called the positive "DROPOUT" threshold, received at input 148. The comparator 180 detects the received peak meeting or exceeding the threshold by providing a "1" output to register 181, indicating that the peak is "qualified" as meeting or exceeding the "DROPOUT" threshold. A positive peak signal on line 115 gates the "qualified" signal to output register 184 and line 185. The comparator 180 indicates that the received asynchronous digital sample failing to meet the "DROPOUT" threshold related to the maximum burst envelope by providing a "0" output to line 185, comprising a "DROPOUT" threshold detection signal for that peak.

Similarly, a negative threshold comparator 190 receives the amplified "DROPOUT" asynchronous digital peak sample at input 175 and compares the "DROPOUT" peak to the previous envelope value, also called the negative "DROPOUT" threshold, received at input 149. The comparator 190 detects the received peak exceeding the threshold (more negative) by providing a "1" output to register 191, indicating that the peak is "qualified" as exceeding the "DROPOUT" threshold. A negative peak signal on line 116 gates the "qualified" signal to output register 194 and line 195. The comparator 190 indicates that the received asynchronous digital sample failing to meet the "DROPOUT" threshold related to the maximum burst envelope by providing a "0" output to line 195, comprising a "DROPOUT" threshold detection signal for that negative peak.

Additionally, when in "TRACKING" mode, logic 178 responds to the presence of a qualified positive peak at register 181 in combination with a positive peak detection signal on line 115, to operate positive peak filter 146 to update the positive envelope 148 with the offset value 144 derived from the qualified peak. Similarly, logic 179 responds to the presence of a qualified negative peak at register 191 in combination with a negative peak detection signal on line 116, to operate negative peak filter 147 to update the negative envelope 149 with the offset value 144 derived from the qualified peak.

As the result, the servo track decoder is operating in "TRACKING" mode, employing only "qualified" peaks which exceed the "DROPOUT" threshold. The envelope measurement will tend to grow to the maximum value of the actual envelope of the received digital samples, rather than representing an average of all the samples, which may occur at any point of the wave form, thereby avoiding the need for a true peak detector.

Although the switch in modes may by accomplished with a "DROPOUT" threshold detection of a single peak, the threshold would have to be set at a value substantially different from the likely previous envelope, resulting in the possible inability to determine the actual maximum value of the envelope.

Figure 11:
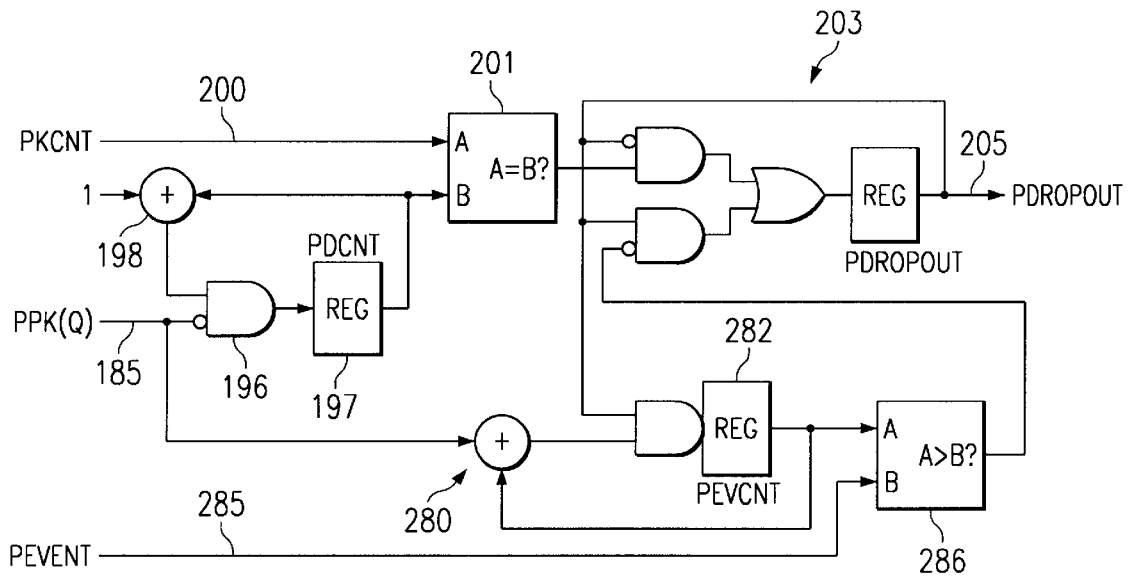
FIGS. 11 and 12 are block diagrams of an embodiment of a "DROPOUT" threshold detector and an "ACQUIRE" detector of the servo track decoder of FIGS. 4 and 5.
Figure 12:
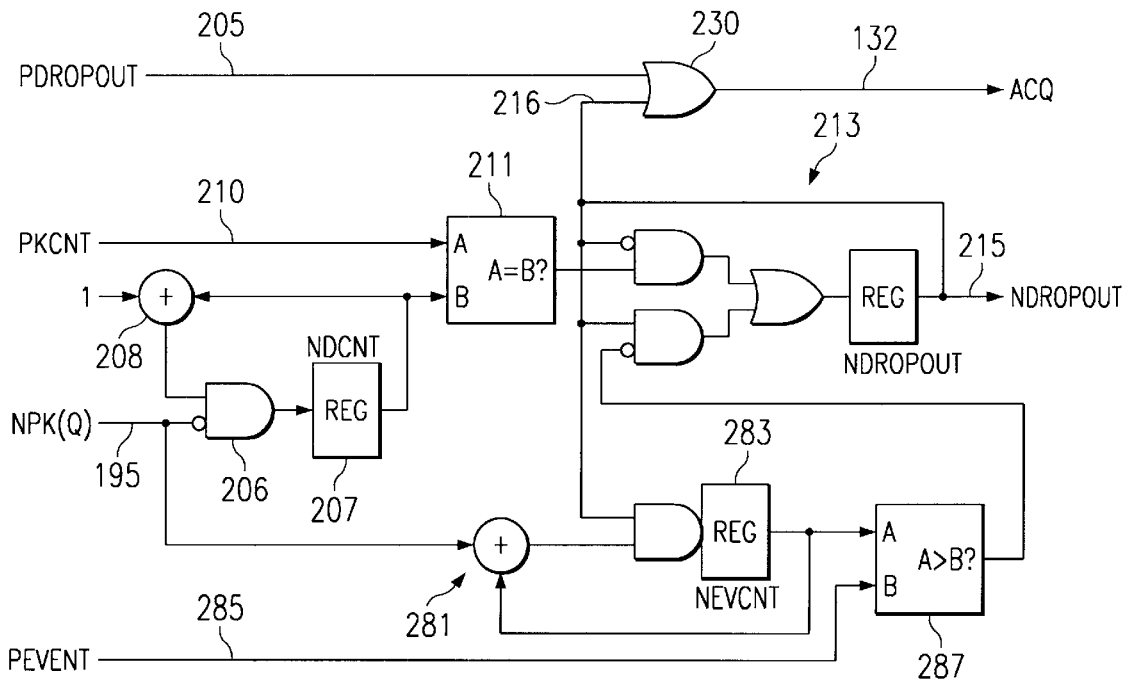

FIGS. 11 and 12 illustrate an embodiment of "DROPOUT" detection logic for switching the mode of the servo track decoder in accordance with the present invention, from a "TRACKING" mode to an "ACQUIRE" mode, employing a "DROPOUT" threshold factor at input 170 which is close to the envelope, but which is not subject to error due to noise. As an example, the "DROPOUT" threshold may be set at 90 percent of the envelope by providing an amplifying multiplier of 1.11 at input 170. In FIG. 11, the positive qualified peak signal is provided at input 185. A "1" signal causes logic 196 to reset the content of a register 197 to "0". This indicates that a positive peak has met "DROPOUT" threshold. However, should a received asynchronous digital sample fail to meet the "DROPOUT" threshold related to the maximum burst envelope, a "0" input is provided at line 185, comprising a "DROPOUT" threshold detection signal for that peak. The presence of a "0" input causes logic 196 to gate the previous count of register 197 as incremented by "1" at logic 198, back to register 197. Thus, so long as there is a "DROPOUT" threshold detection, the number contained in register 197 continues to increment. The clocking of the logic 196 and 198 is preferably at the digital sample or peak detection clock rate. Alternatively, the detection of each positive peak from output 115 of FIG. 7 may be supplied to logic 198 and increment the count. In either case, the count of register 197 is related to the number of peaks received failing to meet the "DROPOUT" threshold, before a "qualified" peak is detected.

A predetermined programmable number is provided at input 200 to detect the sequentially received digital samples that fail to meet the "DROPOUT" threshold. As an example, if the count of register 197 is the clock count at the digital sample rate, the predetermined number may be 150. A comparator 201 compares the count of the register 197 to the predetermined programmable number of input 200, and operates logic 203 to provide a positive peak "DROPOUT" threshold detection signal on line 205. The positive peak "DROPOUT" threshold detection signal is latched by logic 203 until reset, as will be explained.

Referring additionally to FIG. 12, the positive peak "DROPOUT" detection signal is supplied at input 205. To sense the negative peaks, the negative qualified peak signal is provided at input 195. A "1" signal causes logic 206 to reset the content of a register 207 to "0". This indicates that a negative peak has met "DROPOUT" threshold. However, should a received asynchronous digital sample fail to meet the "DROPOUT" threshold related to the maximum burst envelope, a "0" input is provided at line 195, comprising a "DROPOUT" threshold detection signal for that peak. The presence of a "0" input causes logic 206 to gate the previous count of register 207 as incremented by "1" at logic 208, back to register 207. Thus, so long as there is a "DROPOUT" threshold detection, the number contained in register 207 continues to increment. As with respect to logic 196 and 198, the clocking of the logic 206 and 208 is preferably at the digital sample or peak detection clock rate, and alternatively, the detection of each negative peak from output 116 of FIG. 7 may be supplied to logic 208 and increment the count. In either case, the count of register 207 is related to the number of peaks received failing to meet the "DROPOUT" threshold, before a "qualified" peak is detected.

A predetermined programmable number is provided at input 210 to detect the sequentially received digital samples that fail to meet the "DROPOUT" threshold. As an example, the programmable number of input 210 may be the same as that of input 200 of FIG. 11. Thus, if the count of register 207 is the clock count at the digital sample rate, the predetermined number may be 150. A comparator 211 compares the count of the register 207 to the predetermined programmable number of input 210, and operates logic 213 to provide a negative peak "DROPOUT" threshold detection signal on line 215 and at line 216. The negative peak "DROPOUT" threshold detection signal is latched by logic 213 until reset, as will be explained.

Thus, the "DROPOUT" threshold detector detects a predetermined programmable number related to the number of sequentially received digital samples that fail to meet the "DROPOUT" threshold, providing the positive "DROPOUT" detection signal on line 205 and the negative "DROPOUT" detection signal at line 216.

In accordance with the present invention, an "ACQUIRE" detector is coupled to the "DROPOUT" threshold detector and responds to the "DROPOUT" threshold detection to detect the minimum envelope for the envelope detector, which provides the minimum envelope output. The "DROPOUT" detection distinguishes the minimum envelope from the maximum envelope and allows measurement of the minimum envelope.

In FIG. 12, "OR" logic 230 responds to the. "DROPOUT" threshold detection on lines 205 or 216, providing an "ACQUIRE" signal on line 132. In a key aspect of the present invention, the "ACQUIRE" signal alters the mode of the servo track detector to an "ACQUIRE" mode to decrease the envelope at outputs 148 and 149 to the minimum envelope. The "ACQUIRE" signal is provided at inputs 132 of gates 232 and 233 of FIG. 9, to gate every positive peak detection signal of line 115 and every negative peak detection signal of line 116 to the respective positive or negative envelope filter 146 or 147 to filter, or adjust, the envelope value by the offset on lines 144, updating the envelope value.

Thus, as discussed above, when in "TRACKING" mode, the error amplitude filter, or envelope filter 146 and 147, filters, with a preceding envelope amplitude 148 or 149, an error amplitude 144 between a qualified digital peak sample and the preceding envelope amplitude, the error amplitude multiplied by a provided gain value. However, when in "ACQUIRE" mode, the error amplitude filter 146 and 147, filters, with a preceding envelope amplitude 148 or 149, an error amplitude 144 between every digital peak sample and the preceding envelope amplitude, the error amplitude multiplied by a provided gain value. There is therefore no upside bias, and the filtered envelope decreases from the maximum envelope to the minimum envelope.

Referring to FIG. 8, in another aspect of the present invention, separate programmable gains may be provided at inputs 240 to multiplexors 130 and 131. The desired one of the programmable gains is selected by the combination of bits represented by "ACQUIRE" input 132 and positive peak input 115. Input 115 represents the low order bit and represents a positive peak with a "1" bit. Input 132 is the high order bit and is "0" when the servo track decoder is in "TRACKING" mode, and "1" when the decoder is in "ACQUIRE" mode. The gain of register 135 of multiplexor 130 is selected if the error is positive (a "0" at multiplexor 140) and the gain of register 136 of multiplexor 130 is selected if the error is negative (a "1" at multiplexor 140).

As the result, when in "TRACKING" mode, the error amplitude 126 is multiplied by a programmable "TRACK ATTACK" gain value upon the error amplitude indicating an increase in amplitude of the envelope amplitude, and the error amplitude 126 is multiplied by a provided programmable "TRACK DECAY" gain value upon the error amplitude indicating a decrease in amplitude of the envelope amplitude.

When in "ACQUIRE" mode, the error amplitude 126 is multiplied by a provided programmable "ACQUIRE DECAY" gain value upon the error amplitude indicating a decrease in amplitude of the envelope amplitude, which is the normal case. A programmable "ACQUIRE ATTACK" gain value may also be provided for the case of overshoot of the envelope in detecting the minimum envelope, where the error amplitude indicates an increase in amplitude of the envelope amplitude.

The various gain values may be programmed at differing values to accomplish different rates of increasing or of decreasing the envelope. As one example, all of the gains are set to one sixteenth, meaning that one sixteenth of the error amplitude 126 comprises the offset amount 144.

Referring additionally to FIGS. 6A and 6B, positive envelope 250 and negative envelope 251 represent the positive and negative envelopes 148 and 149 of FIG. 9 for burst 85 of FIG. 6A, or the positive envelope 252 and negative envelope 253 for burst 90 of FIG. 6B, during "TRACKING" mode, at which time only "qualified" peak samples are employed to provide the offset amount 144. Positive envelope 260 and negative envelope 261 of FIG. 6A, or positive envelope 262 and negative envelope 263 of FIG. 6B, represent the positive and negative envelopes 148 and 149, also during "TRACKING" mode, but as the "DROPOUT" detector is counting the peaks failing to meet the positive and the negative "DROPOUT" threshold. Upon the count meeting the "DROPOUT" threshold number, the servo track detector switches to "ACQUIRE" mode, and decreases on each detected peak sample as shown by positive envelope 270 and negative envelope 271 of FIG. 6A, of positive envelope 272 and negative envelope 273 of FIG. 6B, to detect the minimum burst 87 or minimum burst 92.

In accordance with another aspect of the present invention, the "ACQUIRE" detector detects a number of qualified digital samples exceeding the amplitude threshold for a programmable predetermined number of digital samples, and switches out of the "ACQUIRE" mode. Thus, once again, only qualified digital samples are employed to filter the envelope, to again reach the maximum value of the envelope 86.

Referring again to FIGS. 11 and 12, each qualified positive and negative peak signal received at respective inputs 185 and 195 is additionally supplied to an incrementing logic 280 and 281, respectively. The incrementing logic increments a count in respective register 282 and 283 for each qualified peak signal received at input 185 and 195, respectively.

A programmed "PEAK EVENT" threshold number is provided at input 285 of comparators 286 and 287. The comparators compare the respective incremented positive and negative counts of qualified digital peak samples to the programmed "PEAK EVENT" threshold number, and provide an output upon the incremented count reaching the programmed number. That output resets the respective logic 203 or 213 to terminate the "DROPOUT" threshold detection signal on line 205 or 215. The next positive peak or negative peak "DROPOUT" threshold detection signal resets the respective incrementor register 282 or 283 to "0". Dropping the "DROPOUT" threshold detection signal of line 205 or of line 215 (based on which line initiated the "ACQUIRE" mode) also drops the "ACQUIRE" signal of line 132, thereby switching the servo track decoder out of "ACQUIRE" mode and back to "TRACKING" mode.

Thus, referring additionally to FIGS. 6A and 6B, when in "ACQUIRE" mode, the detection of a number of qualified digital samples at the positive envelope 290 or negative envelope 291 of FIG. 6A, or at the positive envelope 292 or negative envelope 293 of FIG. 6B, meeting the programmed predetermined "PEAK EVENT" threshold number of samples, switches the decoder out of "ACQUIRE" mode. Then, only the qualified digital peak samples are filtered into the envelope, shown as positive envelope 294 and negative envelope 295 of FIG. 6A, and as positive envelope 296 and negative envelope 297 of FIG. 6B. As an example, the "PEAK EVENT" threshold number may be programmed at a value of 10.

One of skill in the art will be able to design alternative forms of logic to accomplish the functions detailed herein without departing from the present invention.

An embodiment of a method in accordance with the present invention is depicted by the flow diagrams of FIGS. 13–18.

Figure 13:
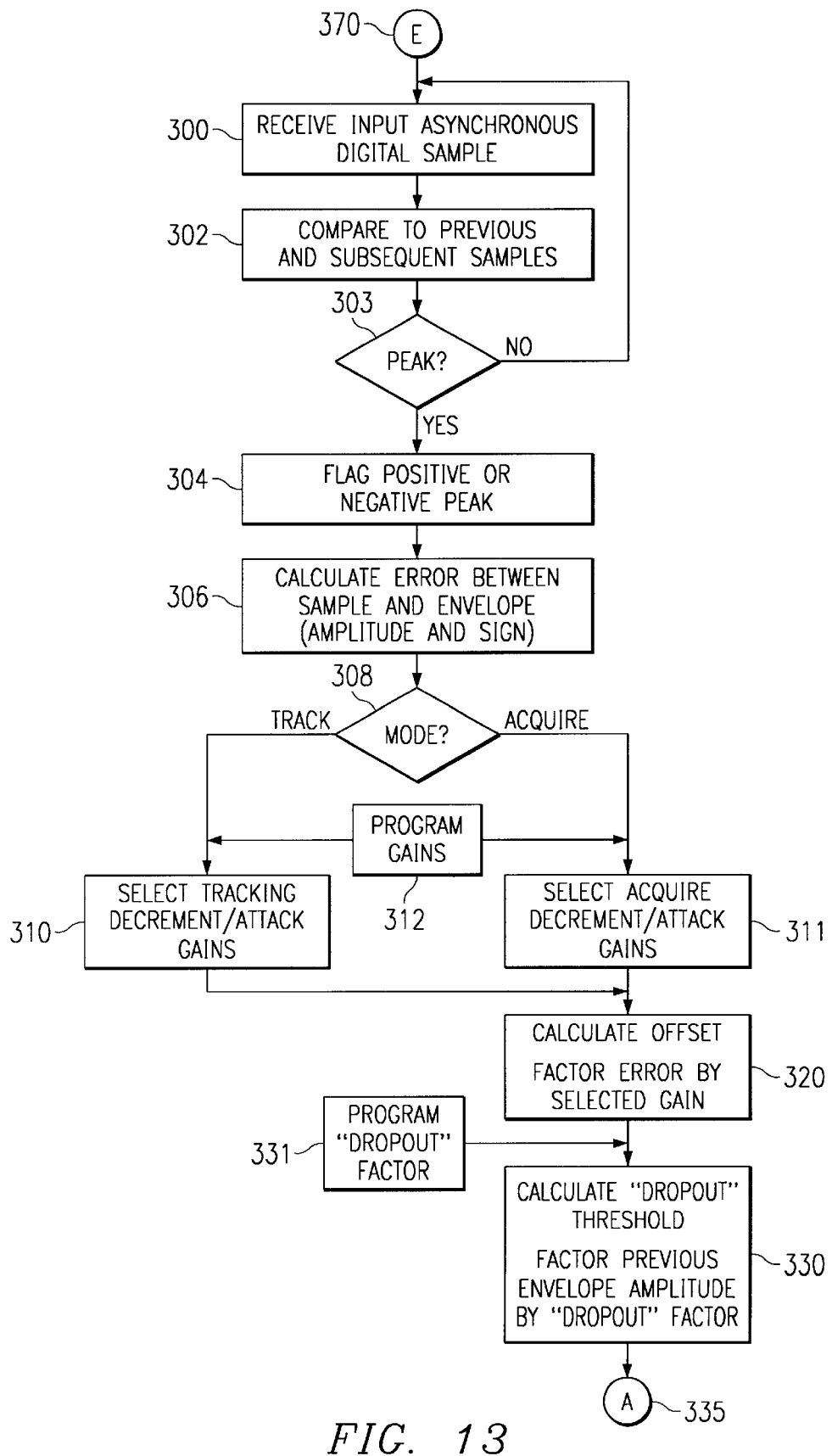
FIGS. 13–18 are flow charts depicting an embodiment of the method of the present invention.

Referring to FIG. 13, at step 300, an asynchronous digital sample of the analog wave form is provided from the analog front end. In step 302, peak comparison logic, such as that of FIG. 7, compares the provided digital sample to the immediately preceding and immediately following digital samples. Step 303 determines whether the digital sample is a peak as compared to the samples of step 302. If the digital sample is not a peak, the process cycles back to step 300 for the next sample. If the digital sample is a peak, "YES" in step 303, the digital sample is identified and flagged as a positive or as a negative peak sample in step 304, for example, at outputs 115 or 116 of FIG. 7.

In step 306, the error between the digital sample and the previous envelope is calculated, for example, by the logic of FIG. 8. This calculation provides both the amplitude and the sign of the error. Step 308 detects the status of input 132 and determines whether the decoder is in "TRACKING" or "ACQUIRE" mode, and step 310 or step 311 selects the appropriate "TRACKING" decay or attack gains or the appropriate "ACQUIRE" decay or attack gains that were programmed in step 312.

Then, in step 320, the offset is calculated by multiplying the error of step 306 by the selected gain of step 310 or of step 311.

In step 330, the "DROPOUT" threshold is determined by multiplying the previous envelope amplitude by a "DROPOUT" factor programmed in step 331. As illustrated in FIG. 8, the "DROPOUT" threshold is calculated by amplifying the digital sample by the "DROPOUT" factor. Connector 335 advances the process to step 340 of FIG. 14 which compares the peak amplitude to the "DROPOUT" threshold, for example, as shown in FIG. 9. Step 341 detects whether the peak is less than the threshold, and, if so, the process proceeds to connector 342, which will be described hereinafter. If the peak is equal to or greater than the "DROPOUT" threshold, "NO", step 344 qualifies the peak.

Step 350 detects whether the servo track decoder is in "ACQUIRE" mode. If not, "NO", the decoder is in "TRACKING" mode, and step 352 filter updates the envelope with the qualified peak of step 344. If the decoder is in "ACQUIRE" mode, "YES", the process both proceeds to connector 355, which will be discussed hereinafter, and to step 356, which filter updates the envelope with any peak digital sample, not just qualified samples.

In step 360, the positive and negative envelopes are summed, such as is illustrated in FIG. 10, to provide the total envelope. Step 362 compares the provided total envelope to the previous envelope, and step 363 determines whether the new total envelope is equal to or greater than the previous maximum envelope, and, if so, "YES", step 364 updates the maximum envelope value with the new total envelope value. If the comparison of step 362 indicates in step 363 that the total envelope value is less than the maximum envelope value, "NO", step 366 determines whether the new total envelope is less than the previous minimum envelope value, and, if so, "YES", step 368 updates the minimum envelope value with the new total envelope. Upon the new total envelope being greater than the previous minimum value, "NO" in step 366, or upon completion of step 364 or step 368, the process cycles to connector 370 back to step 300 of FIG. 13 to receive the next asynchronous digital sample.

Figure 14:
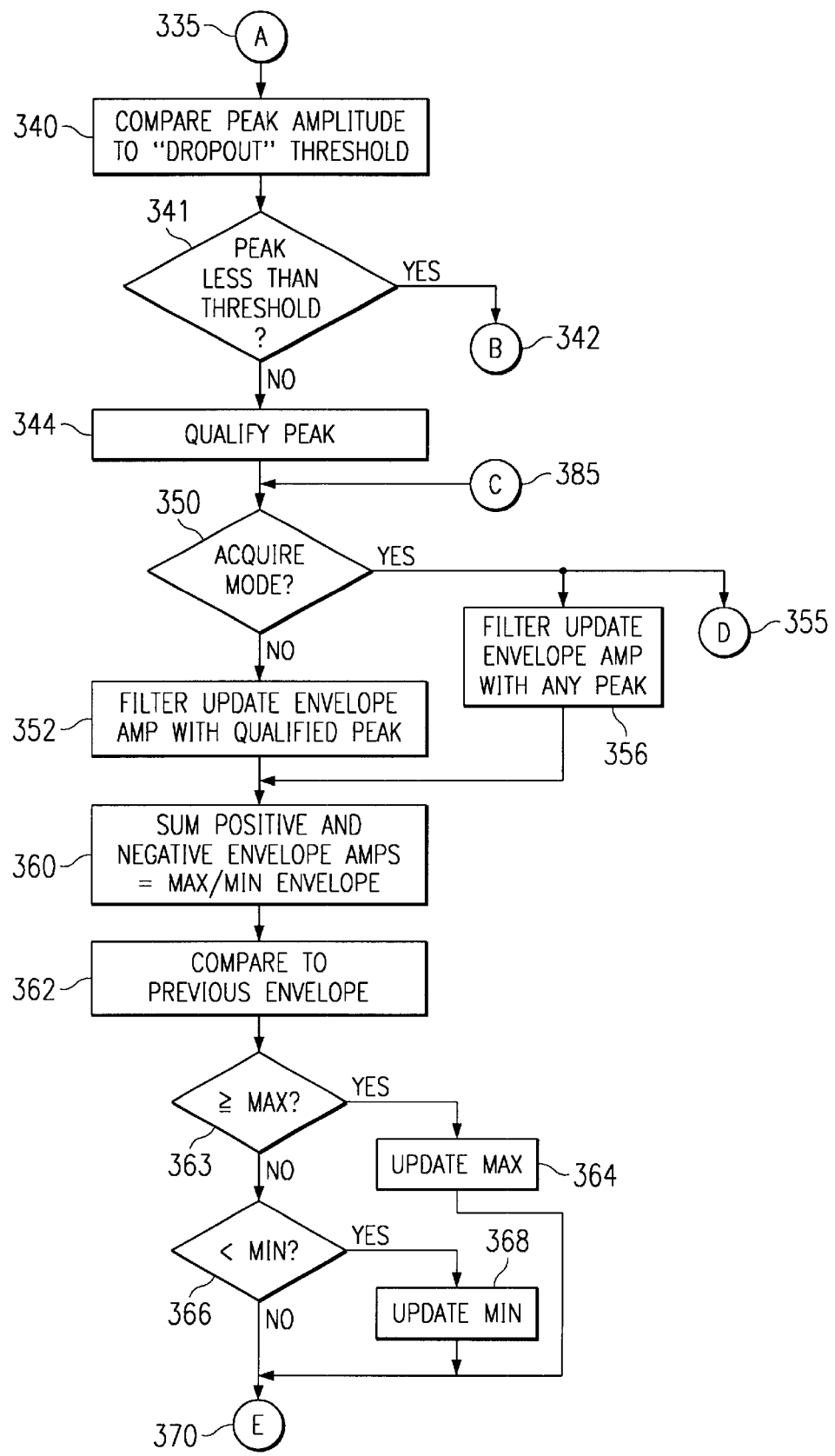
Figure 15:
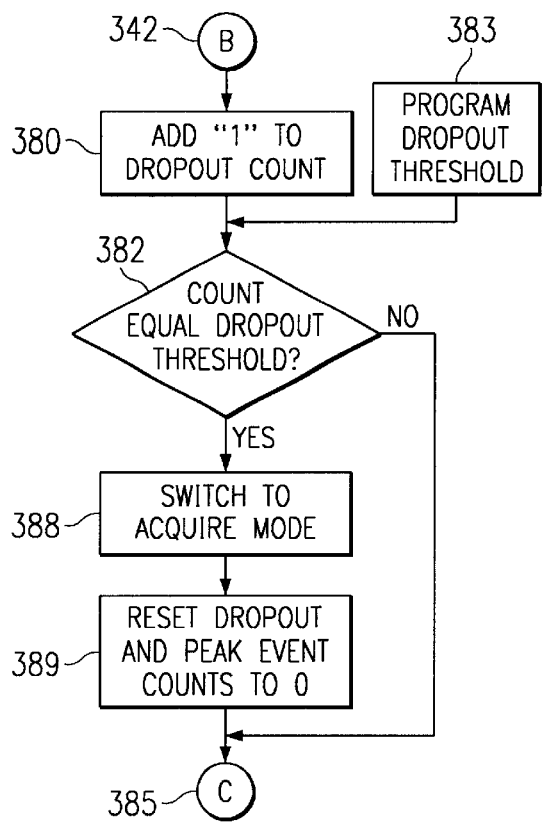

If, in step 341 of FIG. 14, the peak is less than the "DROPOUT" threshold, the process proceeds via connector 342 and adds "1" to the dropout count in step 380, such as is illustrated in FIGS. 11 and 12. Step 382 determines whether the count has reached a predetermined number programmed in step 383 which represents the number of sequentially received digital samples that fail to meet the "DROPOUT" threshold. If the count does not equal the threshold, "NO", the process cycles to connector 385 to FIG. 14 to conduct any filtering.

If the count of step 380 meets the threshold number, "YES" in step 382, step 388 switches the servo track decoder to the "ACQUIRE" mode, and step 389 resets the dropout and peak event counts to "0". The process then cycles, via connector 385, to FIG. 14 to conduct filter updating of the envelope.

Figure 16:
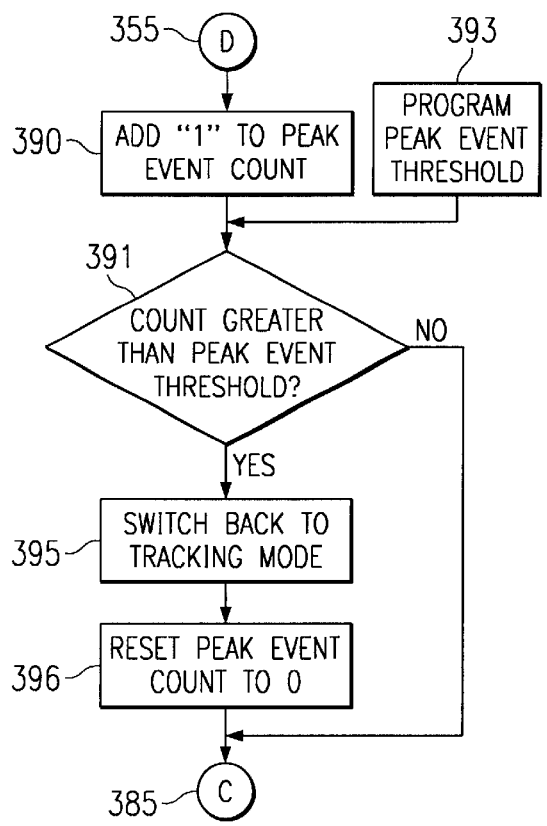

Upon step 350 in FIG. 14 indicating that the decoder is in "ACQUIRE" mode, while step 344 had qualified the peak, connector 355 proceeds to step 390 of FIG. 16. Step 390 adds "1" to the peak event count, and step 391 determines whether the count has reached a "PEAK EVENT" predetermined number programmed in step 393 which represents the number of digital samples that meet or exceed the "DROPOUT" threshold. If not, "NO", the decoder remains in "ACQUIRE" mode and the process cycles back to FIG. 14 and directly to step 356. If the incremented number has reached the "PEAK EVENT" number, "YES" in step 391, step 395 switches the servo track decoder out of "ACQUIRE" mode and back to "TRACKING" mode, and step 396 resets the peak event count to "0". The process then cycles, via connector 385, to step 350 of FIG. 14 and step 350 now recognizes that the decoder is no longer in "ACQUIRE" mode, proceeding to step 352 to filter update the envelope with the qualified peak of step 344.

Figure 17:
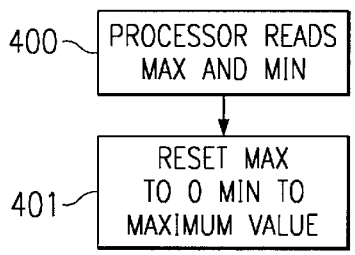

FIG. 17 provides an example of a process, for example of the microprocessor 80 of FIG. 5, for latching and reading the maximum and minimum envelope values. In step 400, the microprocessor reads the maximum and minimum envelope values, and, in step 401, provides a reset signal, such as at line 165 in FIG. 10, resetting the maximum envelope value to all "0" and resetting the minimum envelope value to all "1", the maximum value.

Figure 18:
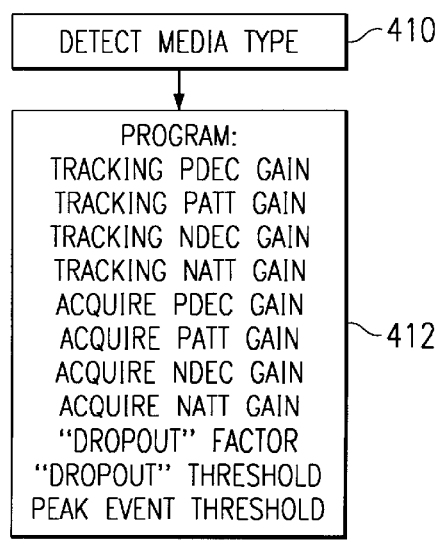

FIG. 18 illustrates an example of a method for providing the programmed predetermined inputs in accordance with the present invention. As one example, step 410 detects the type of media to be read. For example, the media may comprise the type having the servo to data track arrangement illustrated in FIG. 2 or may comprise the type having the servo to data track arrangement illustrated in FIG. 3. In another example, the different media may have different magnetic characteristics. As the result of the determination of step 410, step 412 programs each of the "TRACKING" and "ACQUIRE" gains 240 of FIG. 8, the multiplied "DROPOUT" factor 170 of FIG. 8, the "DROPOUT" count number 200 and 210 of FIGS. 11 and 12, and the "PEAK EVENT" threshold number 285 of FIGS. 11 and 12.

One of skill in the art will be able to design alternative steps to perform the functions detailed herein without departing from the present invention.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method of decoding asynchronous digital samples of prerecorded servo track positioning information, said prerecorded servo track positioning information comprising adjoining servo tracks having different servo patterns, one of said servo patterns comprising a constant amplitude signal of a single first frequency, and the other of said servo patterns alternating between a constant amplitude burst signal of a single second frequency and a zero amplitude null signal, said asynchronous digital samples received from a digital servo detector having a laterally positioned servo head adjacent said prerecorded servo track positioning information, moving longitudinally with respect to each other, said asynchronous digital samples representing said first frequency signal combined with said second frequency burst signal and said first frequency signal combined with said null signal, said method comprising the steps of:

measuring the amplitude of a burst envelope of the maximum of said asynchronous digital samples;

detecting said received asynchronous digital samples failing to meet a "DROPOUT" amplitude threshold related to said maximum burst envelope;

responding to said "DROPOUT" threshold detection, detecting an envelope of the minimum of said asynchronous digital samples; and measuring the amplitude of an envelope of the minimum of said asynchronous digital samples, whereby a ratio of said measured maximum envelope amplitude and said measured minimum envelope amplitude represents said lateral position of said servo head.

2. The method of claim 1, wherein said "DROPOUT" threshold detection step additionally comprises detecting a predetermined number related to the number of sequentially received said asynchronous digital samples failing to meet said "DROPOUT" amplitude threshold.

3. The method of claim 2, wherein said predetermined number of digital samples comprises a programmable value.

4. The method of claim 1, additionally comprising the initial step of identifying ones of said received asynchronous digital samples as peaks upon said digital samples having a greater amplitude as compared to the immediately preceding and succeeding said received asynchronous digital samples.

5. The method of claim 4, wherein said step additionally comprises the steps of multiplying said burst envelopes by a "DROPOUT" factor to provide said "DROPOUT" amplitude threshold, and comparing said identified digital samples to said "DROPOUT" amplitude threshold, additionally qualifying ones of said identified digital samples exceeding said "DROPOUT" amplitude threshold.

6. The method of claim 5, wherein said maximum burst envelope step additionally comprises the steps of filtering, with a preceding envelope amplitude, an error amplitude between said one of said qualified digital samples and said preceding envelope amplitude, said error amplitude multiplied by a predetermined "TRACK" gain.

7. The method of claim 6, wherein said predetermined "TRACK" gain comprises at least one programmable value.

8. The method of claim 6, wherein said predetermined "TRACK" gain comprises a predetermined "TRACK ATTACK" gain upon said error amplitude indicating an increase in amplitude of said envelope amplitude, and comprises a predetermined "TRACK DECAY" gain upon said error amplitude indicating a decrease in amplitude of said envelope amplitude.

9. The method of claim 8, wherein each of said predetermined "TRACK ATTACK" and said predetermined "TRACK DECAY" gains, and said "DROPOUT" factor, comprise programmable values.

10. The method of claim 8, wherein said predetermined "TRACK ATTACK" and said predetermined "TRACK DECAY" gains are each separate for positive and negative peaks.

11. The method of claim 10, wherein each of said predetermined positive peak "TRACK ATTACK" and "TRACK DECAY" gains, and each of said predetermined negative peak "TRACK ATTACK" and "TRACK DECAY" gains, and said "DROPOUT" factor, comprise programmable values.

12. The method of claim 6, wherein said step of responding to said "DROPOUT" threshold detection additionally comprises the steps of responding to said "DROPOUT" threshold detection, switching to an "ACQUIRE" mode, updating said envelope amplitude by filtering with a preceding said envelope amplitude, an error amplitude between any of said identified digital samples and said preceding envelope amplitude, said error amplitude multiplied by a predetermined "ACQUIRE DECAY" gain.

13. The method of claim 12, wherein said predetermined "ACQUIRE DECAY" gain comprises a programmable value.

14. The method of claim 12, wherein said step of responding to said "DROPOUT" threshold detection additionally comprises the steps of, when in said "ACQUIRE" mode, detecting a number of said qualified digital samples exceeding said "DROPOUT" amplitude threshold for a predetermined number of said qualified digital samples, switching out of said "ACQUIRE" mode.

15. The method of claim 14, wherein said predetermined number of said qualified digital samples exceeding said "DROPOUT" amplitude threshold comprises a programmable number.

16. The method of claim 14, wherein said "ACQUIRE DECAY" gain is separate for positive and negative peaks.

17. The method of claim 16, wherein each of said positive peak and said negative peak "ACQUIRE DECAY" gains comprises a programmable value.

18. The method of claim 6, wherein each of said envelope measuring steps additionally comprises continually updating said respective measured envelope amplitude with the most recent said filtered envelope amplitude.

19. The method of claim 18, additionally comprising the steps of loading said measured maximum and said measured minimum envelope amplitudes, resetting said measured maximum envelope amplitude to zero, and resetting said measured minimum envelope amplitude to the greatest value.

20. A servo track decoder for decoding asynchronous digital samples of prerecorded servo track positioning information, said prerecorded servo track positioning information comprising adjoining servo tracks having different servo patterns, one of said servo patterns comprising a constant amplitude signal of a single first frequency, and the other of said servo patterns alternating between a constant amplitude burst signal of a single second frequency and a zero amplitude null signal, said decoder coupled to a digital servo detector and receiving said asynchronous digital samples therefrom, said digital servo detector having a laterally positioned servo head adjacent said prerecorded servo track positioning information, moving longitudinally with respect to each other, said asynchronous digital samples representing said first frequency signal combined with said second frequency burst signal and said first frequency signal combined with said null signal, said decoder comprising:

an envelope follower receiving said asynchronous digital samples, detecting and providing a maximum envelope output measuring the amplitude of a burst envelope of the maximum of said asynchronous digital samples, and detecting and providing a minimum envelope output measuring the amplitude of a burst envelope of the minimum of said asynchronous digital samples;

a "DROPOUT" threshold detector coupled to said envelope follower and receiving said asynchronous digital samples, detecting said received asynchronous digital samples failing to meet a "DROPOUT" amplitude threshold related to said maximum burst envelope, providing a "DROPOUT" threshold detection signal; and an "ACQUIRE" detector coupled to said "DROPOUT" threshold detector and said envelope follower, responding to said "DROPOUT" threshold detection, detecting said minimum burst envelope for said envelope follower, whereby a ratio of said measured maximum envelope amplitude output and said measured minimum envelope amplitude output represents said lateral position of said servo head.

21. The decoder of claim 20, wherein said "DROPOUT" threshold detector detects a predetermined number related to the number of sequentially received said asynchronous digital samples failing to meet said "DROPOUT" amplitude threshold to provide said "DROPOUT" threshold detection signal.

22. The decoder of claim 21, wherein said predetermined number of digital samples comprises a programmable number.

23. The decoder of claim 22, additionally comprising a peak identifier coupled to said digital servo detector and comparing said received asynchronous digital samples to the immediately preceding and succeeding said received asynchronous digital samples, identifying ones of said received asynchronous digital samples as peaks upon said digital samples having a greater amplitude as compared to said immediately preceding and succeeding received asynchronous digital samples, said envelope follower, said "DROPOUT" threshold detector, and said "ACQUIRE" detector receive only said identified peak asynchronous digital samples.

24. The decoder of claim 23, wherein said "DROPOUT" threshold detector multiplies said envelope follower burst envelopes by a "DROPOUT" factor to provide said "DROPOUT" amplitude threshold, and compares said identified digital samples to a said "DROPOUT" amplitude threshold, additionally qualifying ones of said identified digital samples exceeding said "DROPOUT" amplitude threshold.

25. The decoder of claim 24, wherein said envelope follower additionally comprises an error amplitude filter for filtering, with a preceding envelope amplitude, an error amplitude between said one of said qualified digital samples and said preceding envelope amplitude, said error amplitude multiplied by a provided predetermined "TRACK" gain.

26. The decoder of claim 25, wherein said provided predetermined "TRACK" gain comprises at least one programmable value.

27. The decoder of claim 25, wherein said envelope follower error amplitude filter provided "TRACK" factor gain comprises a provided predetermined "TRACK ATTACK" gain upon said error amplitude indicating an increase in amplitude of said envelope amplitude, and comprises a provided predetermined "TRACK DECAY" gain upon said error amplitude indicating a decrease in amplitude of said envelope amplitude.

28. The decoder of claim 27, wherein each of said provided "TRACK ATTACK" and said provided "TRACK DECAY" gains, and said "DROPOUT" factor comprise programmable values.

29. The decoder of claim 27, additionally comprising provided predetermined separate positive peak and negative peak said "TRACK ATTACK" and "TRACK DECAY" gains.

30. The decoder of claim 29, wherein each of said provided predetermined positive peak "TRACK ATTACK" and said "TRACK DECAY" gains, and each of said provided predetermined negative peak "TRACK ATTACK" and said "TRACK DECAY" gains, and said "DROPOUT" factor, comprise programmable values.

31. The decoder of claim 25, wherein said "ACQUIRE" detector additionally comprises a switch for switching to an "ACQUIRE" mode in response to said "DROPOUT" detection signal, and said envelope follower responds to said "ACQUIRE" mode, said error amplitude filter filtering, with a preceding said envelope amplitude, an error amplitude between any of said identified digital samples and said preceding envelope amplitude, said error amplitude multiplied by a provided predetermined "ACQUIRE DECAY" gain.

32. The decoder of claim 31, wherein said predetermined "ACQUIRE DECAY" gain comprises a programmable value.

33. The decoder of claim 31, wherein said "ACQUIRE" detector additionally comprises a "PEAK EVENT" threshold detector, detecting a number of said qualified digital samples exceeding said "DROPOUT" amplitude threshold for a predetermined number of said qualified digital samples, said "PEAK EVENT" threshold detector operating said switch to switch out of said "ACQUIRE" mode.

34. The decoder of claim 33, wherein said predetermined number of said qualified digital samples exceeding said "DROPOUT" amplitude threshold comprises a programmable number.

35. The decoder of claim 33, additionally comprising provided separate positive peak and negative peak said predetermined "ACQUIRE DECAY" gains.

36. The decoder of claim 35, wherein each of said provided predetermined positive peak and said provided predetermined negative peak "ACQUIRE DECAY" gains comprises a programmable value.

37. The decoder of claim 25, wherein said envelope follower additionally comprises measured maximum output logic and measured minimum output logic continually updating said respective measured envelope amplitude with the most recent said filtered envelope amplitude.

38. The decoder of claim 37, wherein said envelope follower additionally comprises latches coupled to said measured maximum output logic and said measured minimum output logic for loading said measured maximum and said measured minimum output envelope amplitudes, and a reset resetting said measured maximum output logic amplitude to zero and resetting said measured minimum output logic amplitude to the greatest value.

39. A servo track positioning system for decoding asynchronous digital samples of prerecorded servo track positioning information and positioning of read/write elements, said prerecorded servo track positioning information comprising adjoining servo tracks having different servo patterns, one of said servo patterns comprising a constant amplitude signal of a single first frequency, and the other of said servo patterns alternating between a constant amplitude burst signal of a single second frequency and a zero amplitude null signal, comprising:

a servo head at a fixed indexed location with respect to said read/write elements, said servo head adjacent said prerecorded servo track positioning information, said servo head and said servo track positioning information moving longitudinally with respect to each other, said servo head reading said prerecorded servo track positioning information;

a digital servo detector coupled to said servo head, detecting said read prerecorded servo track positioning information and providing asynchronous digital samples representing said first frequency signal combined with said second frequency burst signal and said first frequency signal combined with said null signal;

an envelope follower coupled to said digital servo detector, receiving said asynchronous digital samples, detecting and providing a maximum envelope output measuring the amplitude of a burst envelope of the maximum of said asynchronous digital samples, and detecting and providing a minimum envelope output measuring the amplitude of a burst envelope of the minimum of said asynchronous digital samples;

a "DROPOUT" threshold detector coupled to said envelope follower and receiving said asynchronous digital samples, detecting said received asynchronous digital samples failing to meet a "DROPOUT" amplitude threshold related to said maximum burst envelope, providing a "DROPOUT" threshold detection signal;

an "ACQUIRE" detector coupled to said "DROPOUT" threshold detector and said envelope follower, responding to said "DROPOUT" threshold detection, detecting said minimum burst envelope for said envelope follower, whereby a ratio of said measured maximum envelope amplitude output and said measured minimum envelope amplitude output represents said lateral position of said servo head; and a servo positioner coupled to said envelope follower for positioning said servo head and said read/write elements in accordance with predetermined ratios of said maximum envelope output and said minimum envelope output.

40. The servo track positioning system of claim 39, wherein said "DROPOUT" threshold detector detects a predetermined number related to the number of sequentially received said asynchronous digital samples failing to meet said "DROPOUT" amplitude threshold to provide said "DROPOUT" threshold detection signal.

41. The servo track positioning system of claim 40, wherein said predetermined number of digital samples comprises a programmable number, and wherein said predetermined "DROPOUT" factor comprises a programmable value.

42. The servo track positioning system of claim 39, additionally comprising a peak identifier coupled to said digital servo detector and comparing said received asynchronous digital samples to the immediately preceding and succeeding said received asynchronous digital samples, identifying ones of said received asynchronous digital samples as peaks upon said digital samples having a greater amplitude as compared to said immediately preceding and succeeding received asynchronous digital samples, said envelope follower, said "DROPOUT" threshold detector, and said "ACQUIRE" detector receive only said identified peak asynchronous digital samples; and wherein said "DROPOUT" threshold detector multiplies said envelope follower burst envelopes by a "DROPOUT" factor to provide said "DROPOUT" amplitude threshold, and compares said identified digital samples to said "DROPOUT" amplitude threshold, additionally qualifying ones of said identified digital samples exceeding said "DROPOUT" amplitude threshold.

43. The servo track positioning system of claim 42, wherein said envelope follower additionally comprises an error amplitude filter for filtering, with a preceding said envelope amplitude, an error amplitude between said one of said qualified digital samples and said preceding envelope amplitude, said error amplitude multiplied by a provided programmable "TRACK ATTACK" gain upon said error amplitude indicating an increase in amplitude of said envelope amplitude, and said error amplitude multiplied by a provided programmable "TRACK DECAY" gain upon said error amplitude indicating a decrease in amplitude of said envelope amplitude.

44. The servo track positioning system of claim 43, additionally comprising provided separate positive peak and negative peak said programmable "TRACK ATTACK" and separate positive peak and negative peak programmable "TRACK DECAY" gains.

45. The servo track positioning system of claim 43, wherein said "ACQUIRE" detector additionally comprises a switch for switching to an "ACQUIRE" mode in response to said "DROPOUT" detection signal, said envelope follower responds to said "ACQUIRE" mode, said error amplitude filter filtering, with a preceding said envelope amplitude, an error amplitude between any of said identified digital samples and said preceding envelope amplitude, said error amplitude multiplied by a provided predetermined "ACQUIRE DECAY" gain; and additionally comprises a "PEAK EVENT" threshold detector, detecting a number of said qualified digital samples exceeding said "DROPOUT" amplitude threshold for a predetermined number of said qualified digital samples, said "PEAK EVENT" threshold detector operating said switch to switch out of said "ACQUIRE" mode.

46. The servo track positioning system of claim 45, additionally comprising provided separate programmable positive peak and programmable negative peak said predetermined "ACQUIRE DECAY" gains.

47. The servo track positioning system of claim 43, wherein said envelope follower additionally comprises measured maximum output logic and measured minimum output logic continually updating said respective measured envelope amplitude with the most recent said filtered envelope amplitude.

48. The servo track positioning system of claim 47, wherein said envelope follower additionally comprises latches coupled to said measured maximum output logic and said measured minimum output logic for loading said measured maximum and said measured minimum output envelope amplitudes, and a reset resetting said measured maximum output logic amplitude to zero and resetting said measured minimum output logic amplitude to the greatest value.

* * * * *